Aug. 30, 1960 — O. W. BONNAFE — 2,950,627
INDEXING MECHANISM
Filed Sept. 15, 1959 — 3 Sheets-Sheet 1

INVENTOR.
Oliver W. Bonnafe
BY
Roberts, Cushman & Grover
ATT'YS

Aug. 30, 1960     O. W. BONNAFE     2,950,627
INDEXING MECHANISM

Filed Sept. 15, 1959     3 Sheets-Sheet 3

INVENTOR.
Oliver W. Bonnafe
BY
Roberts, Cushman & Grover
ATT'YS

United States Patent Office 2,950,627
Patented Aug. 30, 1960

2,950,627

INDEXING MECHANISM

Oliver W. Bonnafe, Hudson, Mass., assignor, by mesne assignments, to The Lapointe Machine Tool Company, Hudson, Mass., a corporation of Maine Filed Sept. 15, 1959, Ser. No. 840,044

17 Claims. (Cl. 74—396)

This invention relates to machine tools of the kind having a rotary work-supporting table and indexing means for turning the table and has for its principal objects to provide a structure in which a high degree of indexing accuracy may be obtained without requiring expensive scraping in and/or precision machining of the component parts; to provide a structure such that a high degree of indexing accuracy may be obtained quickly and easily without need for special tools and/or techniques; and to provide a structure in which a high degree of indexing accuracy can be obtained without departing materially from conventional construction and hence without expensive innovations in construction.

In accordance with the invention there is a table, a support mounting the table for rotation about a predetermined axis, and indexing means for effecting rotation of the table comprising a worm wheel on the support, a worm meshing therewith, and means for adjusting the worm wheel relative to the axis of rotation of the table to dispose the entire pitch circle of the worm wheel substantially uniformly tangent to the pitch line of the worm, independently of the center of rotation of the table. In the preferred form, the table and support have concentrically arranged central openings and are mounted on a fixed shaft for rotation about its axis. A bearing is disposed in the central openings about the shaft for centering the support and table for rotation thereabout, and there is an adjusting ring interposed between the opening in the support and the bearing. In the preferred form the wall of the opening slopes downwardly and inwardly, a plurality of arcuate wedges are disposed between the wall of the opening and the adjusting ring and there are means for adjusting the heightwise position of the wedges. Alternatively, there are semicircular tapering recesses at the interfaces between the adjusting ring and the support which collectively define tapering openings, the axis of which are parallel to the axis of rotation of the table. Tapered plugs are engageable within the holes and, by such engagement, adapted to shift the support and worm wheel relative to the bearing and hence to the axis of rotation of the table.

In another form the tapered openings may be formed peripherally of the support, adjacent the inner side of the worm wheel, into which tapered plugs may be inserted to displace the metal of the support and hence the worm wheel radially with respect to the axis of rotation of the support.

The invention will now be described in greater detail with reference to the accompanying drawings wherein.

The structure, herein illustrated, is primarily for obtaining a high degree of indexing accuracy in machine tools of the kind in which there is a work-supporting table to which work pieces may be fastened for machining, it being understood however that the structure may be employed in any apparatus where indexing of a table, or the like, to a high degree of indexing accuracy is required.

Figure 1:
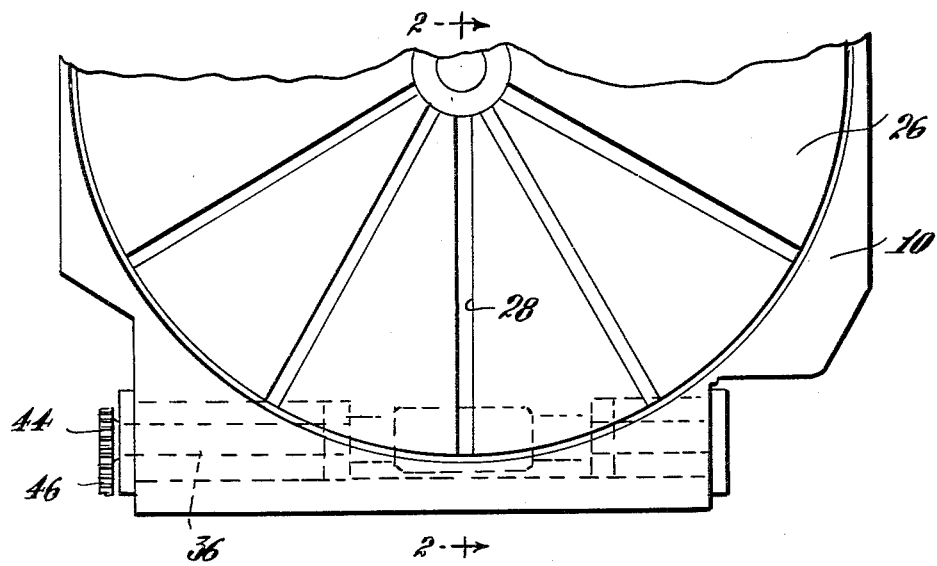
Fig. 1 is a plan view of one-half of the work-supporting table showing in dotted lines an indexing worm associated therewith.

As shown in Fig. 1, the invention is embodied in a machine tool, such as a drill press and has a bed 10 which may rest on a suitable base, centrally of which there is an upwardly disposed bearing post 12, within which there is a shaft 14, the upper end of which projects upwardly from the bearing post 12. A hub 16, having a central opening 18, is mounted over the upper end of the shaft 14 so as to turn about the axis of the shaft. The hub is supported peripherally, independently of the shaft, by an annular bearing ring 20, situated peripherally of the hub, at its underside, a bearing ring 22 subjacent thereto on the bed, and a ball bearing ring 24 interposed between the rings 20 and 22.

A work-supporting table 26 is mounted on the upper side of the hub 16 and this, in turn, contains grooves 28 for receiving gibs for clamping work to the table.

In accordance with the preferred construction, the hub (Fig. 2) has formed in its upper side a centrally located groove surrounding the opening 18 having a bottom wall 48 and a vertical side wall 50. A ball bearing assembly 52 is mounted on the shaft 14 so as to rest in the groove on the bottom wall 48 and is held in place by a nut 54 threaded onto the upper end of the shaft. The upper part of the ball bearing assembly fits into a centrally located opening 55 in the underside of the table and by engagement therewith holds the table centered with respect to the axis of the shaft.

For indexing the table an annular worm wheel 30 is fastened to the hub with its teeth 32 facing outwardly. As shown, the hub has a deep peripheral groove above the bearing ring 20 and the worm wheel 30 is fastened therein by bolts 34. The bed has, at one side (Fig. 1), an extension containing spaced bearing openings 36, within which there is journaled a shaft 38. A worm 40 is mounted on the shaft with its teeth 42 meshing with the teeth 32 of the worm wheel. At one end of the shaft 38 there is means, for example a gear 44, for rotating the shaft. A meshing gear 46 and conventional crank mechanism may be employed for turning the worm shaft and hence indexing the table in one direction or the other, depending upon the direction of rotation of the worm.

Figure 6:
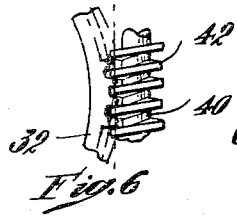
Fig. 6 is a diagrammatic view of the tangential relation between the pitch circle of the worm wheel and the pitch circle of the worm.

Indexing accuracy of 0.0001 of an inch is desirable and to obtain such accuracy in indexing throughout rotation of the table the teeth of the worm wheel and the teeth of the worm must mesh substantially uniformly, that is, the pitch circle of the worm wheel must be substantially uniformly tangent throughout its length to the pitch line of the worm, as shown diagrammatically in Fig. 6.

Conventionally available ball bearing assemblies, such as that disposed about the shaft 14, even though precision built, have slight eccentricities and while these eccentricities are small in themselves they are multiplied by the radius of the worm wheel; consequently, when the component parts are assembled the pitch circle of the worm wheel is not uniformly tangent to the pitch line of the worm. The customary procedure has been to scrap in and machine the parts, however, this practice is prohibitively expensive, time consuming and has to be repeated if through negligence in transportation or use the initial adjustment is disturbed. Moreover, even with the utmost care it is seldom possible to achieve accuracy up to 0.0001 of an inch.

Figure 4:
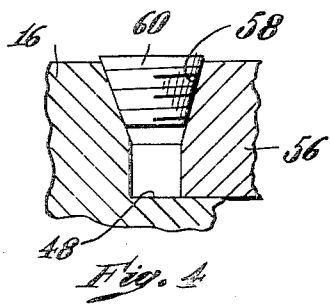
Fig. 4 is an enlarged section taken on the line 4—4 of Fig. 3.
Figure 3:
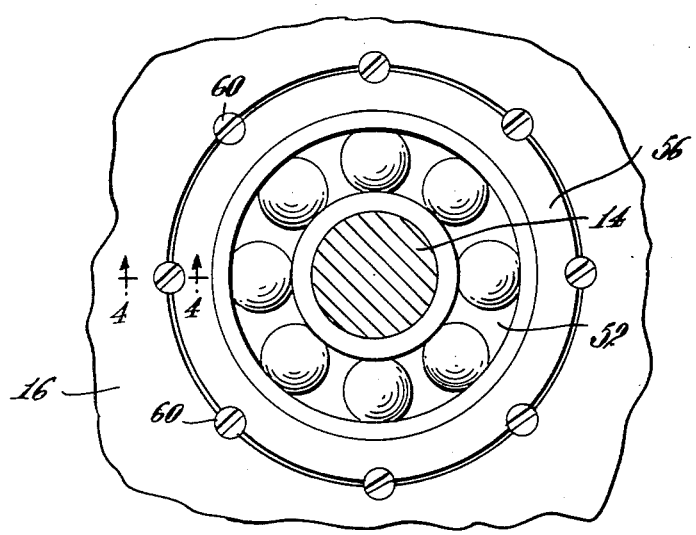
Fig. 3 is a fragmentary plan to much larger scale of the table supporting hub showing the adjusting means.

In accordance with this invention indexing accuracy of 0.0001 and better can be achieved quickly and easily. As herein illustrated, this is accomplished by placing an adjusting ring 56 or bushing about the ball bearing assembly so as to fill the annular space between it and the wall 50. A plurality of tapered holes 58 are then drilled in the bushing and hub at the interfaces between them, one-half of each hole being situated in the outer side of the bushing 56 and the other half in the side wall 50 of the recess, as shown in Figs. 3 and 4. The holes 58 are spaced uniformly about the axis of the shaft, with their axes parallel thereto, there being eight (8) such holes, as shown in Fig. 3. Preferably, the holes 58 are threaded and threaded plugs 60 are screwed into them.

As thus constructed, portions of the worm wheel may be adjusted radially by axial adjustment of the tapered plugs 60, to compensate for any eccentricity in the parts until all portions of the pitch circle on the worm wheel are substantially tangent to the pitch line of the worm, independent of the center of rotation of the table. In practice, this may be accomplished quickly and easily by removing the worm wheel and then rotating the hub so as to move the teeth of the worm wheel relative to the fixed gauge and, as the hub is rotated, adjusting the threaded plugs 60 inwardly or outwardly so that the ends of the teeth just touch the gauge. When this is perfected and the gauge replaced by the worm the pitch circle of the worm wheel and the pitch line of the worm will be substantially tangent throughout. The number of tapering holes and plugs may, of cource, be varied and may be even or odd.

Figure 5:
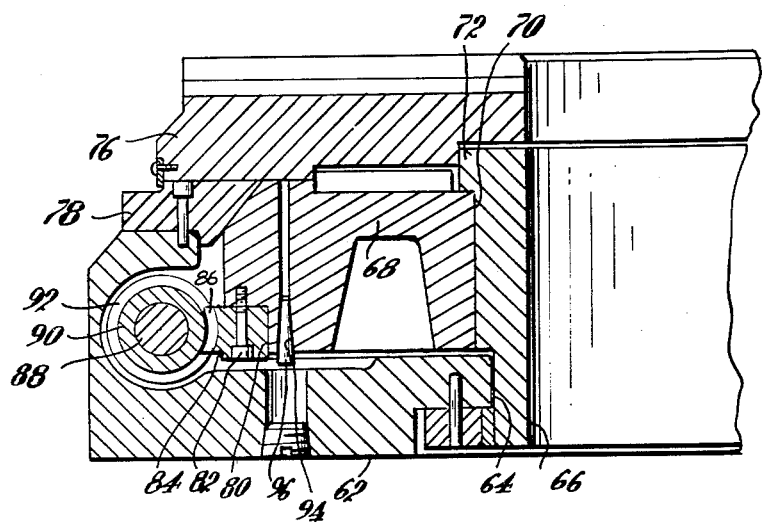
Fig. 5 is a diametrical section of an alternative form of table support and adjusting means.

Alternatively, the structure may take the form shown in Fig. 5. In this form the bed 62 has a central opening 64 in which there is disposed an upright hollow bearing shaft 66. A hub 68, having a central opening 70, is mounted on the shaft between the bed 62 and a retaining flange 72, at the upper end, for rotation about the axis of the bearing shaft. Support for the hub is afforded through the table 76 by contact of the latter with a bearing ring 78 bolted to the bed 62. The table 76 is provided on its upper side with conventional jig clamping grooves and gibs.

The hub has at its underside a peripheral groove 80, in which there is fastened by bolts 82 a worm wheel 84 with its teeth 86 facing outwardly. The bed has an extension in which there are spaced bearings for a worm shaft 88, on which there is a worm 90 having teeth 92 which mesh with the teeth 86 of the worm wheel. As indicated above, the worm shaft 88 may be rotated in one direction or the other by conventional means.

Adjustment of the worm wheel relative to the worm is provided for by a plurality of tapered openings 94 disposed peripherally of the hub, adjacent the worm wheel at the inner side thereof, and parallel to the axis of the shaft. Tapered plugs 96 are disposed in these tapered openings and by driving them inwardly the metal of the hub behind the worm wheel, because of the thin sections between the worm wheel and the tapered hole, may be displaced radially, sufficiently to in turn displace the worm wheel. Adjustment of the worm wheel with reference to the worm may be obtained, as previously indicated, by removing the worm and replacing it with a gauge and then turning the hub with reference to the gauge and driving the wedges inwardly or outwardly, so that every point along the periphery of the worm wheel is substantially tangent to the gauge.

Figure 2:
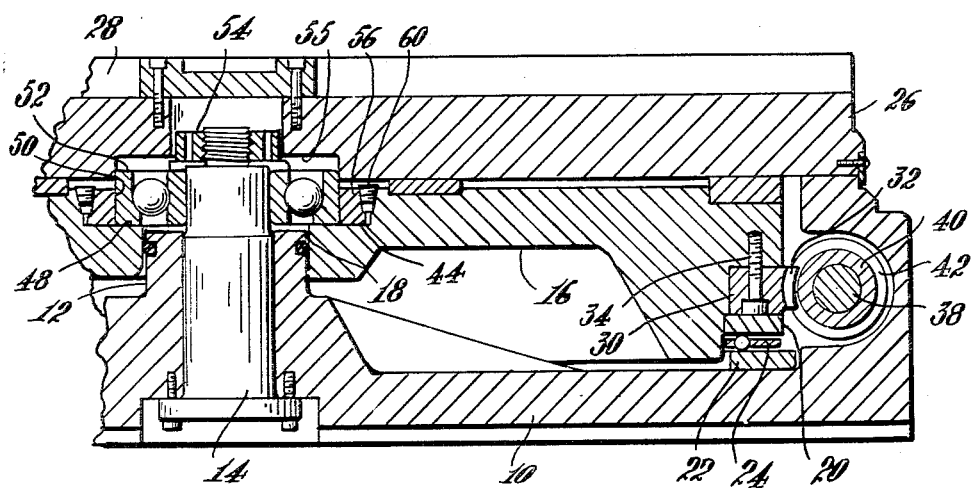
Fig. 2 is a diametrical section taken on the line 2—2 of Fig. 1.
Figure 7:
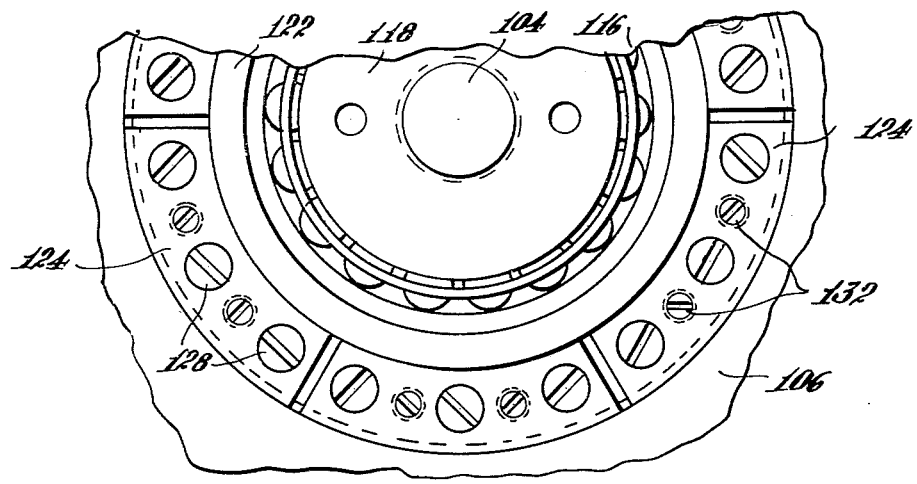
Fig. 7 is a fragmentary plan view to much larger scale of still another form of table supporting hub and adjusting means, the worm wheel and worm being omitted.
Figure 8:
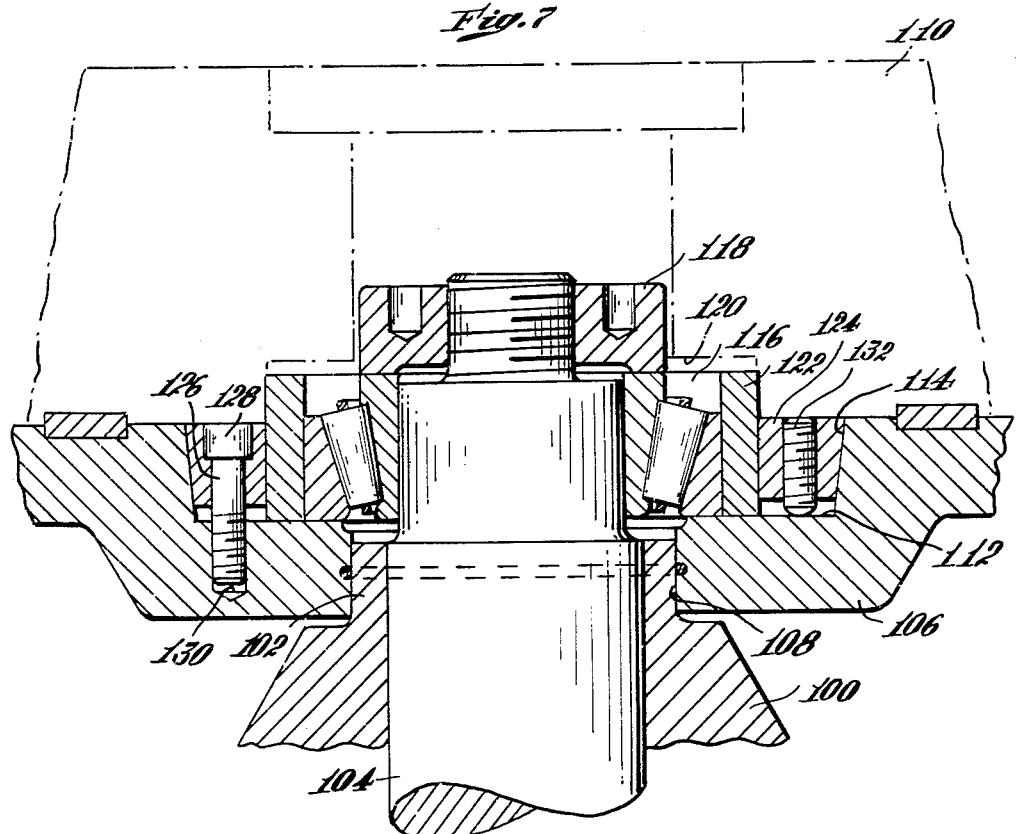
Fig. 8 is a diametrical section of Fig. 7.

Still another form of the invention is shown in Figs. 7 and 8. Referring to Fig. 8, only the upper portion of the bed 100 is shown and the bearing post 102 supported thereby. Within the bearing post there is a shaft 104, the upper end of which projects upwardly from the bearing post. A hub 106, having a central opening 108 is mounted over the upper end of the shaft so as to turn about its axis and is supported peripherally in any suitable manner radially outward of its center, for example as illustrated in Fig. 2.

A work-supporting table 110 shown in dot and dash lines is mounted on the upper side of the hub 106 and this contains suitable grooves for receiving work-clamping gibs.

In this form of the invention the hub 106 has formed on its upper side a centrally located opening for the shaft 104 and a circular groove surrounding the opening having a bottom wall 112 and an inclined side wall 114. A roller bearing assembly 116 is mounted on the shaft 104 so as to rest in the groove on the bottom wall 112 and is held in place by a nut 118 threaded onto the upper end of the shaft 104. The upper part of the roller bearing assembly extends upwardly into a centrally located opening 120 in the underside of the table.

An adjusting ring or cage 122 is disposed about the roller bearing assembly within the groove in the hub, the upper portion of which fits into the opening 120 in the table and by engagement therewith holds the table centered with respect to the axis of the shaft 104. The outer surface of the cage is spaced from the inclined wall 114 and in combination therewith forms a circular groove. The wall 114 is inclined downwardly toward the wall of the cage so that the bottom of the groove groove is narrower than the top and in the groove there are disposed a plurality of arcuate-shaped wedges 124, there being six (6) shown herein, although it is to be understood that the exact number of the wedges is not important. Each of the wedges 124 contains five (5) holes 126, three of the same size, one at each end and one at its center and two smaller holes 132 intermediate the larger ones. Screw bolts 128 are inserted through the large holes and threaded into threaded openings 130 at the bottom of the groove, that is, in the hub 106. By turning the bolts the wedges may be forced down into the groove so as to shift the cage and hence compensate for any eccentricity. By individual adjustment of the several wedges the worm wheel at the edge of the hub may be adjusted so that its pitch circle is substantially tangent to the pitch line of the worm, the latter not being shown in Figs. 7 and 8 because they are of the same form as shown in Figs. 1 and 2. The smaller holes 132 are threaded and contain screws 134, the lower ends of which bear against the bottom of the groove and which, by rotation, will force the wedge upwardly in the groove.

The arcuate bearing surfaces afforded by the wedges provide for an easier and more accurate adjustment than is possible with the forms of the invention shown in Figs. 2 and 5 and hence is preferred.

Accuracy of better than plus or minus 0.0001 of an inch can be obtained and maintained by the use of the foregoing means of adjustment.

The principle of adjustment involved in each structure is the same and it is to be understood that while shown herein for obtaining accuracy in machine tools, it is equally useful in any other instance where a high degree of indexing accuracy is required.

It should be understood that the present disclosure is for the purpose of illustration only and that this invention includes all modifications and equivalents which fall within the scope of the appended claims.

I claim:

1. In a machine tool, a table and table support, indexing means for effecting rotation of the table and support about a predetermined axis, comprising a worm wheel at the periphery of the support, a worm meshing therewith, and means for adjusting the radial position of the worm wheel relative to said axis of rotation of the table to bring the pitch circle of the worm wheel into substantially uniformly tangent relation to the pitch line of the worm.

2. In a machine tool, a table and table support, indexing means for effecting rotation of the table and the support about a predetermined axis, comprising a worm wheel at the periphery of the support, a worm meshing therewith, and means associated with the support for adjusting the worm wheel relative to said axis of rotation so that each increment of the pitch circle of the worm wheel is substantially tangent to the pitch line of the worm.

3. In a machine tool, a table, means mounting the table for rotation about a predetermined axis, indexing means for effecting rotation of the table mounting means about a given axis, comprising a worm wheel fastened to the periphery of the mounting means, a worm meshing with the worm wheel, and means for adjusting the mounting means relative to the table so that the pitch circle of the worm wheel is substantially uniformly tangent at all points throughout its periphery to the pitch line of the worm.

4. In a machine tool, a table mounted to turn about a predetermined axis, means supporting the table for rotation about said axis, indexing means for effecting movement of the support, comprising a worm wheel fixed to the periphery of the support and a worm mounted adjacent thereto in mesh with the worm wheel, and means for adjusting the support relative to the center of rotation of the table so that the pitch circle of the worm wheel and the pitch line of the worm are substantially tangent throughout rotation of the worm wheel relative to the worm, independently of the center of rotation of the table.

5. In a machine tool, a shaft, a table containing a centrally disposed bearing opening, means supporting the table for rotation about the axis of the shaft, said means containing an opening concentric with that of the table, a bearing disposed on the shaft within the openings in the table and support, indexing means comprising a worm wheel fastened to the support and a worm mounted adjacent thereto in mesh with the worm wheel, a bushing disposed in said bearing opening in the support about the bearing, and means for adjusting the support and bushing relative to each other so that the pitch circle of the worm wheel, and the pitch line of the worm are substantially tangent at all points of engagement of the worm wheel with the worm, independently of the axis of rotation of the table.

6. In a machine tool, a shaft, a table and support therefor containing concentric, centrally disposed bearing openings, a bearing element disposed in said central openings about the shaft for centering the table for rotation about the axis of the shaft, a worm wheel attached to the periphery of the support, a worm mounted in mesh with the worm wheel, an adjusting ring disposed in the opening in the support about the bearing and a plurality of tapering elements disposed between the adjusting ring and said bearing opening in the support, said tapered elements being movable axially to shift the support relative to the adjusting ring to bring every increment of the pitch circle of the worm wheel substantially tangent to the pitch line of the worm.

7. In a machine tool, a shaft, a table supporting hub containing a centrally disposed bearing opening, means supporting the hub for rotation about the shaft, a worm wheel fixed to the periphery of the hub, a worm, means supporting the worm in mesh with the worm wheel for effecting rotation of the hub, an anti-friction bearing disposed about the shaft, an adjusting ring disposed within said central opening about the anti-friction bearing, the interfaces between the adjusting ring and the bearing opening containing tapered openings parallel to the axis of the shaft, and a plurality of tapered plugs disposed in the openings, holding the hub so adjusted relative to the axis of the shaft that the pitch circle of the worm wheel and the pitch line of the worm gear are substantially uniformly tangent throughout the length of the worm wheel.

8. A machine according to claim 7, wherein the tapered holes and plugs are threaded.

9. In a machine tool, a shaft, a table, means supporting the table for rotation about the shaft, a worm wheel fastened to the periphery of said support, means mounting a worm in mesh with the worm wheel, and means on the said support adjacent the worm wheel for adjusting the worm wheel relative to said support to bring all portions of the pitch circle of the worm wheel throughout its perimeter into substantially uniformly tangent relation to the pitch line of the worm.

10. In a machine tool, a shaft, a table, means supporting the table for movement about the shaft, a worm wheel fastened to the periphery of the support, means mounting a worm in mesh with the worm wheel, said support containing a plurality of tapered openings circumferentially thereof adjacent to the inner side of the worm wheel and parallel to the axis of the shaft, and a plurality of tapered plugs driven into said openings in such varying amounts as to cause the entire periphery of the worm wheel to be substantially uniformly tangent to the pitch line of the worm.

11. In a machine tool, a shaft, a table supporting hub containing a centrally disposed bearing opening, means supporting the hub for rotation about the shaft, a worm wheel fixed to the periphery of the hub, a worm, means supporting the worm in mesh with the worm wheel for effecting rotation of the hub, an anti-friction bearing disposed about the shaft, an adjusting ring disposed within said central opening about the anti-friction bearing, the interfaces between the adjusting ring and the bearing opening forming a circular groove, the walls of which converge, a plurality of arcuate-shaped wedges disposed in the groove, and means for adjusting the position of the wedges heightwise of the groove.

12. Apparatus according to claim 11, wherein screw bolts extend through the wedges and are threaded into the hub for adjusting the heightwise position of the wedges in the groove.

13. Apparatus according to claim 11, wherein each wedge contains a plurality of holes, and screw bolts are disposed in said holes and threaded into the hub at the bottom of the groove for adjusting the wedges heightwise of the groove.

14. Apparatus according to claim 11, wherein there are means threaded in each of the wedges rotatable to elevate the wedges within the groove.

15. In a machine tool, a shaft, a table supporting hub containing a centrally disposed bearing opening, means supporting the hub for rotation about the shaft, a worm wheel fixed to the periphery of the hub, a worm, means supporting the worm in mesh with the worm wheel for effecting rotation of the hub, a bearing assembly disposed about the shaft, a cage encircling the assembly, the outer face of the cage and the wall of the opening being radially spaced and converging, a plurality of arcuate-shaped wedges disposed in the space between the cage and wall, means for drawing the wedges downwardly between the cage and the wall and other means for raising the wedges upwardly.

16. In a machine tool, a shaft, a table supporting hub containing a centrally disposed bearing opening, means supporting the hub for rotation about the shaft, a worm wheel fixed to the periphery of the hub, a worm, means supporting the worm in mesh with the worm wheel for effecting rotation of the hub, a roller bearing assembly disposed about the shaft, a cage encircling the assembly, the outer face of the cage and the wall of the opening being radially spaced and forming a groove, the wall of the opening being inclined toward the outer face of the cage, a plurality of arcuate-shaped wedges disposed in the groove, screw bolts extending through the arcuate-shaped wedges and into the hub at the bottom of the groove for forcing the wedges downwardly in the groove and other means threaded in the wedges for forcing the wedges upwardly in the groove.

17. In a machine tool, a shaft, a table supporting hub containing a centrally disposed bearing opening having a downwardly and inwardly inclined wall, means supporting the hub for rotation about the shaft, a worm wheel fixed to the periphery of the hub, a worm, means supporting the worm in mesh with the worm wheel for effecting rotation of the hub, a bearing assembly disposed about the shaft, and an adjusting ring encircling the assembly, the outer wall of the ring and the inclined wall of the opening conjointly forming a groove which diminishes in width from top to bottom, a plurality of arcuate wedge-shaped elements disposed in the groove, each having arcuate surfaces for engagement with the walls of the groove, means for forcing the wedge-shaped element downwardly in the groove, and other means for forcing the wedge-shaped element upwardly in the groove.

No references cited.